(12) United States Patent
Luckevich et al.

(10) Patent No.: US 6,226,586 B1
(45) Date of Patent: May 1, 2001

(54) FOUNDATION BRAKE CONTROL ALGORITHM FOR ELECTRO-HYDRAULIC BRAKE SYSTEM AND BRAKE-BY-WIRE SYSTEM

(75) Inventors: Mark S. Luckevich, Ann Arbor, MI (US); Andrew W. Kingston, Heidesheim (DE)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/379,881

(22) Filed: Aug. 24, 1999

Related U.S. Application Data

(63) Continuation of application No. PCT/US98/04202, filed on Mar. 5, 1998
(60) Provisional application No. 60/038,043, filed on Mar. 6, 1997.

(51) Int. Cl.[7] .............................. G06F 19/00; G06F 7/00; G06G 7/00
(52) U.S. Cl. ............................... 701/70; 701/83; 701/110; 188/72.1; 188/72.4; 303/10; 303/15; 303/20; 303/155
(58) Field of Search ................. 303/10, 15, 20, 303/155; 188/72.1, 72.4; 701/83, 110

(56) References Cited

U.S. PATENT DOCUMENTS

| | | | |
|---|---|---|---|
| 4,093,316 | 6/1978 | Reinecke | 303/100 |
| 4,435,021 | 3/1984 | Hoenick | 303/10 |
| 4,602,702 | 7/1986 | Ohta et al. | 188/72.1 |
| 4,690,034 | 9/1987 | Ando et al. | 91/369 A |
| 4,784,442 | 11/1988 | Petersen | 303/15 |
| 4,818,036 | 4/1989 | Reinecke | 303/50 |
| 4,919,493 | 4/1990 | Leiber | 303/15 |
| 4,950,028 | 8/1990 | Harrison | 303/113.2 |
| 5,040,852 | 8/1991 | Takata | 303/113.4 |
| 5,230,549 | 7/1993 | Osada et al. | 303/3 |
| 5,261,730 | 11/1993 | Steiner et al. | 303/113.4 |
| 5,322,352 | 6/1994 | Ohno et al. | 303/3 |
| 5,545,929 | 8/1996 | Fijioka et al. | 303/166 |
| 5,558,409 | 9/1996 | Walenty et al. | 303/10 |
| 5,884,548 | 3/1999 | Ando et al. | 91/369.2 |
| 5,884,986 | * 3/1999 | Shimizu | 303/122.12 |
| 5,890,776 | * 4/1999 | Sawada | 303/116.1 |
| 5,941,608 | 8/1999 | Campau et al. | |
| 5,943,937 | 8/1999 | Endo | 91/369.2 |
| 5,951,116 | * 9/1999 | Nagasaka et al. | 303/14 |
| 6,033,035 | 3/2000 | Neumann et al. | 303/113.4 |

FOREIGN PATENT DOCUMENTS

| | | |
|---|---|---|
| 0519287 | 12/1992 | (EP) . |
| 60-107447 | 6/1985 | (JP) . |
| WO 96/34784 | 11/1996 | (WO) . |
| WO 98/33689 | 8/1998 | (WO) . |

* cited by examiner

Primary Examiner—William A. Cuchlinski, Jr.
Assistant Examiner—Ronnie Mancho
(74) Attorney, Agent, or Firm—MacMillan, Sobanski & Todd, LLC (57) ABSTRACT

A brake control system determines utilizes a sensed amount of brake travel and a sensed amount of master cylinder pressure in determining a base brake control signal for an electro-hydraulic brake management system. The system also provides a springer function to provide an appropriate amount of brake jump-in, based on vehicle velocity and pedal travel. For pure brake-by-wire systems that have no hydraulic components, brake force is substituted for master cylinder pressure in determining a base brake control signal.

9 Claims, 9 Drawing Sheets

FOUNDATION BRAKE CONTROL ALGORITHM FOR ELECTRO-HYDRAULIC BRAKE SYSTEM AND BRAKE-BY-WIRE SYSTEM

CROSS REFERENCE TO RELATED APPLICATIONS

This application is a Continuation of International Patent Application PCT/US98/04202, filed Mar. 5, 1998 and which designated the United States, which was a Continuation of U.S. Provisional Application 60/038,043 filed on Mar. 6, 1997.

BACKGROUND OF THE INVENTION

The invention relates to an apparatus and method for providing brake control based on brake pedal travel and master cylinder pressure. In particular, the invention relates to an apparatus and method that blends a signal corresponding to brake pedal travel with a signal corresponding to master cylinder pressure in order to provide a brake control signal to a brake control loop.

Pressure control systems are necessary in order to control an amount of brake pressure to be applied and to be dumped from brake systems. Pressure control is used for electro-hydraulic brake (EHB) systems, which can also perform the control functions used for anti-lock brake systems (ABS), traction control systems (TC), and vehicle stability control systems (VSC).

Figure 1:
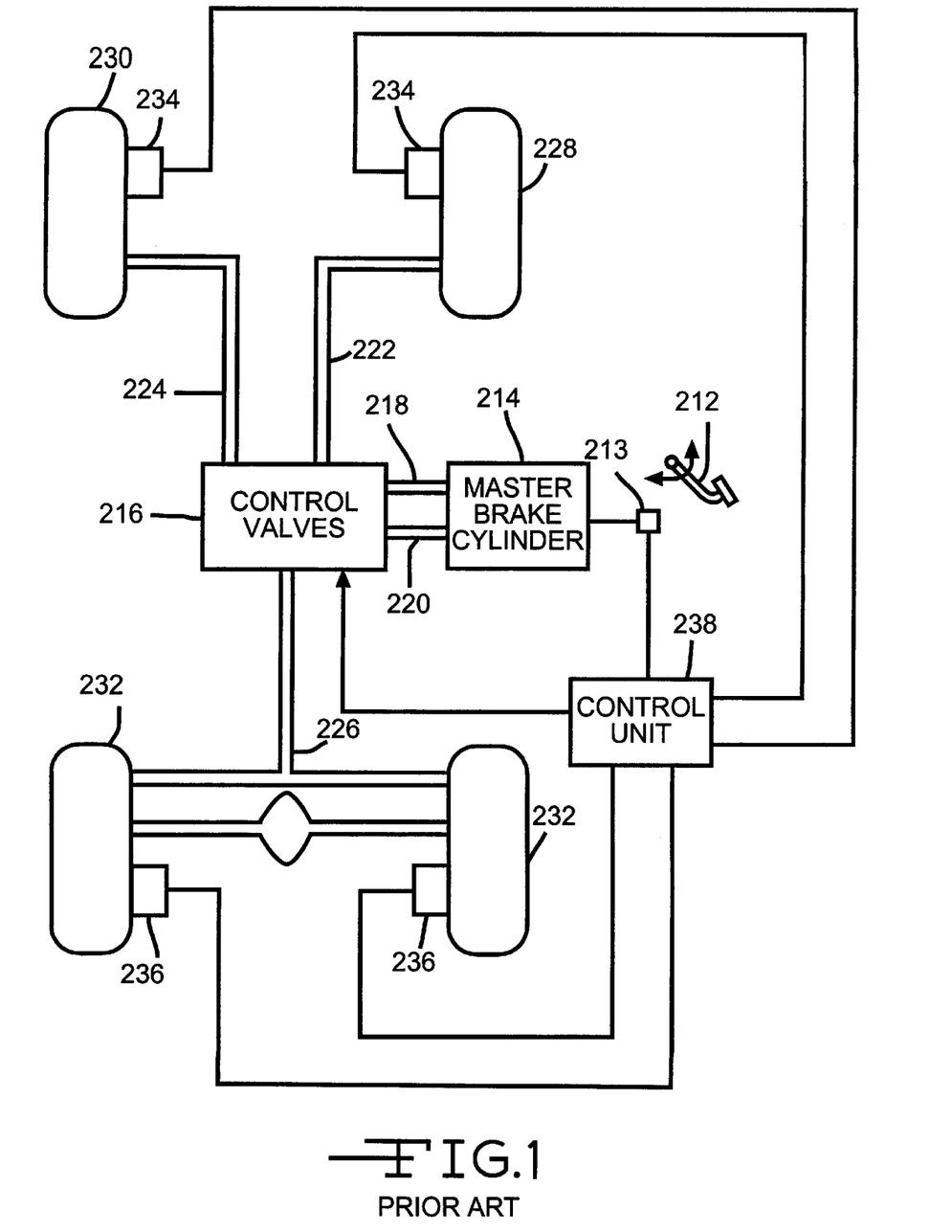
FIG. 1 shows a conventional electro-hydraulic brake control system.

A block diagram of a conventional braking system for a vehicle is shown in FIG. 1. Such a system is described in U.S. Pat. No. 5,551,769, issued to Mark Luckevich, and which is incorporated herein by reference. The conventional braking system is a hydraulic system, and includes a brake pedal 212, a brake switch 213, a brake master cylinder 214, control valves 216, brake fluid conduits 218, 220, 222, 224 and 226, as well as a right front wheel 228 and a left front wheel 230, and a pair of rear wheels 232.

The conventional system includes a pair of vehicle wheel speed sensors 234 for measuring the speed of each of the front wheels 228 and 230, and a pair of vehicle wheel speed sensors 236 for measuring the speed of each of the rear wheels 232. The system further includes a brake system control unit 238. Each of the wheel sensors 234 and 236 are operatively connected to the control unit 238, which is itself operatively connected to the anti-lock brake system control valve 216, via an electrical or fiber optic connection.

In conventional braking systems, such as that shown in FIG. 1, the driver input is through the brake pedal 212 to the master cylinder 214. This is a mechanical system in which the brake command and power is provided by the mechanical motion of a master cylinder piston acting on the brake fluid. The pressure is then boosted (usually with a vacuum system) and actuated through the fluid to the brake calipers and rotors.

In conventional braking systems, a brake signal based on an amount of travel of the brake pedal 212 is provided to the control unit 238. While this signal is useful in determining a desired amount of pressure to be applied at brake calipers, it is desired to have a signal that is more indicative of a desired amount of braking, as determined by activation of the brake pedal 212 by an operator of the vehicle.

SUMMARY OF THE INVENTION

An object of the present invention is to provide a signal that is indicative of an operator's desired amount of braking.

This and other objects are achieved by a method of providing a brake control signal. The method includes a step of measuring an amount of travel of a brake pedal and an amount of master cylinder pressure. The method also includes a step of determining the brake control signal based on the travel of the brake pedal and the master cylinder pressure.

The above-mentioned object and other objects are also achieved by an apparatus for providing a brake control signal. The apparatus includes a first detector for detecting an amount of travel of a brake pedal. The apparatus also includes a second detector for detecting an amount of master cylinder pressure. The apparatus further includes a control circuit for providing the brake control signal based on the outputs of the first and second detectors.

BRIEF DESCRIPTION OF THE DRAWINGS

These and other objects and advantages of the invention will become more fully apparent from the following detailed description when read in conjunction with the accompanying drawings with like reference numerals indicating corresponding parts throughout, and wherein.

DETAILED DESCRIPTION OF THE INVENTION

A preferred embodiment of the invention will be described herein with reference to FIGS. 2–7.

Figure 2:
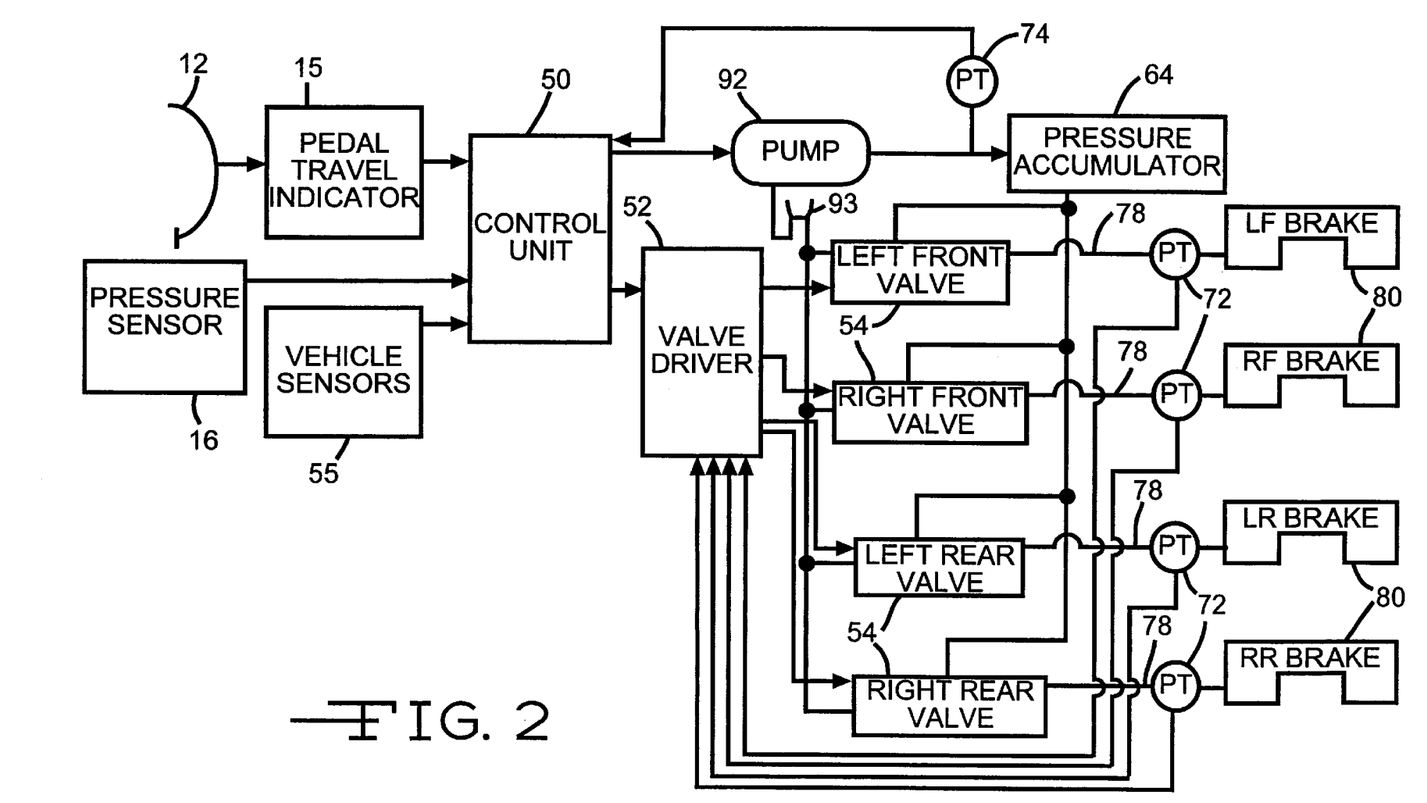
FIG. 2 shows an electro-hydraulic brake system according to the invention.

FIG. 2 Shows a braking system for an electro-hydraulic brake (EHB) system according to the invention. In an EHB system, the brake command, which is based on the desired amount of braking as determined by pedal travel and master cylinder pressure, is translated to brake torque at the brake calipers. Preferably, high fidelity proportional pressure control valves are used to apply and modulate the brake pressure. Hydraulic power is supplied by a pump and a high pressure accumulator (HPA). In a brake-by-wire (BBW) system, all of the braking force is generated by an "electric caliper."Thus, in both systems, brake control is done electronically, where the major differentiating factor is that the EHB system maintains a hydraulic subsystem (or a "wet" system) and the BBW system is purely electronic (or "dry" system).

In FIG. 2, movement of a brake pedal 12 is detected by a pedal travel indicator 15, which outputs a signal indicating an amount of brake travel to a Control Unit 50. There is no booster between the brake pedal and the master cylinder, so master cylinder pressure is directly related to force exerted on the brake pedal. Master cylinder pressure is measured by a Pressure Sensor 16, which outputs a signal indicating the master cylinder pressure to the Control Unit 50. Other vehicle sensors 55 also supply inputs to Control Unit 50, such as wheel speed, amount of movement of the steering wheel, etc.

Control Unit 50 outputs a control signal to a Valve Driver 52, so as to place Valves 54 in a state such that a desired amount of brake pressure is supplied from the High Pressure Accumulator (HPA) 64 and is applied to Brake Calipers 80. Each wheel of the vehicle has a Pressure Transducer (PT) 72 and a Brake Caliper 80, as shown in FIG. 2. Each valve 54 is independently controlled by a respective signal received from Valve Driver 52. Pressure transducers (PT) 72 measure an amount of actual brake pressure at the Brake Calipers 80, and these measurements are fed back as feedback signals to the Valve Driver 52. Using these feedback signals, Valve Driver 52 provides closed loop pressure compensation to eliminate pressure command error so as to achieve the desired amount of braking pressure.

Pressure transducers 72 may be located either nearby the valve driver 52 or nearby the brake calipers 80. If the pressure transducers 72 are located nearby the valve driver 52, then an amount of brake pressure at the brake calipers 80 is estimated based on the brake line length from the pressure transducers 72 and the brake calipers and the measured brake pressure at the pressure transducers 72. Alternatively, if pressure control valves are used for valves 54, then there is no need for pressure transducers, as the loop compensation is done hydraulically. In an alternative configuration, the valve drivers are included in the control unit 50.

Valves 54 are driven by respective signals that correspond to a difference between the respective control signal and the respective feedback signal. Control unit 50 also supplies signals to a Pump 92, which is used to supply hydraulic fluid to HPA 64. HPA 64 outputs fluid under pressure to input ports of Valves 54. A pressure transducer 74 provides a signal to the Control Unit 50 that is indicative of a current pressure in HPA 64.

Also shown in FIG. 2 is a low pressure port for each of the valves 54, whereby when a reduction in pressure is needed, fluid goes out of the low pressure ports of the valves 54 to a reservoir 93, thereby lessening the pressure in the hydraulic lines 78. The fluid collected in the reservoir 93 is used to replenish the HPA 54 via the Pump 92.

In the system shown in FIG. 2, Control Unit 50 provides an output signal to Valve Driver 52 based on the output by a particular control system, such as a vehicle stability control (VSC), traction control (TC), anti-lock brake (ABS), or base brake control (BBC) system.

In the system according to the invention, a brake pressure control system inputs vehicle information and wheel specific information, and determines when and at what rate to control the brake pressure. The brake pressure control system utilizes wheel specific and vehicle information in order to compute a voltage (or current) command, which is used to control wheel pressure. In the preferred embodiment, a voltage command controls wheel pressure through the activation of a pressure control valve (PCV) at each wheel. The voltage command is modified as a function of the wheel dynamic response, such that if the wheel speed response is determined to be unstable, then the driver commanded braking voltage is modified so that, a pressure reduction results, thereby stabilizing the transient response of the unstable wheel.

As mentioned earlier, pedal travel indicator 15 outputs a signal indicating an amount of brake travel to Control Unit 50, and master cylinder pressure sensor 16 outputs a signal indicating the master cylinder pressure. Based on these two signals, as well as an estimated vehicle speed signal that is determined based on information received from Vehicle Sensors 55, the Control Unit 50 determines a base brake command signal $P_{BBC}$ indicative of a desired amount of braking by the operator. The vehicle speed signal is used in computing a brake jump-in amount, which is an optional feature of the present invention. Also, a fade compensation function is an optional feature of the present invention. That is, referring now to FIG. 3, an alternative configuration (not shown) would not include the springer calculation unit 347 and would not receive a fade compensation signal Fade_Comp, and would thereby compute a base brake command signal based on pedal travel and master cylinder pressure inputs without the use of these other values.

Under normal brake applies, Control Unit 50 determines a first command signal based on the brake pedal travel according to the following equation:

$$P_{cmd\_travel} = [(Ped\_Travel - Ped\_Travel\_Min) * K_1 + (Ped\_Travel - Ped\_Travel\_Min)^2 * K_2]$$

where Ped_Travel is a signal received by the Control Unit 50 from the Pedal Travel Indicator 15, and which is indicative of an amount of travel of the brake pedal 12. In the above equation, Ped_Travel_Min is a constant value indicative of a certain amount of distance that the pedal must be moved before a base brake command is generated that is based on pedal travel, and $K_1$ and $K_2$ are constants for the respective linear and quadratic terms of pedal travel used to generate $P_{BBC}$.

Control Unit 50 determines a second command signal based on the master cylinder pressure according to the following equation:

$$P_{cmd\_mc\_p} = [(P\_mc - P\_mc\_min) * K_3 + (P\_mc - P\_mc\_min)^2 * K_4]$$

where P_mc is a signal received by the Control Unit 50 from the Master Cylinder Pressure Sensor 16, and which is indicative of an amount of master cylinder pressure. In the above equation, P_mc_min is a constant value indicative of a certain amount of pressure that must be sensed in the master cylinder before a base brake command is generated from the master cylinder pressure, and $K_3$ and $K_4$ are constants for the respective linear and quadratic terms of master cylinder pressure used to generate $P_{BBC}$. In both of the equations given above, limiting and backlash functions are applied to the pedal travel signal Ped_Travel and the master cylinder pressure signal P_mc, as will be described later, but are not discussed here in order to more clearly explain the present invention at this stage.

Figure 6:
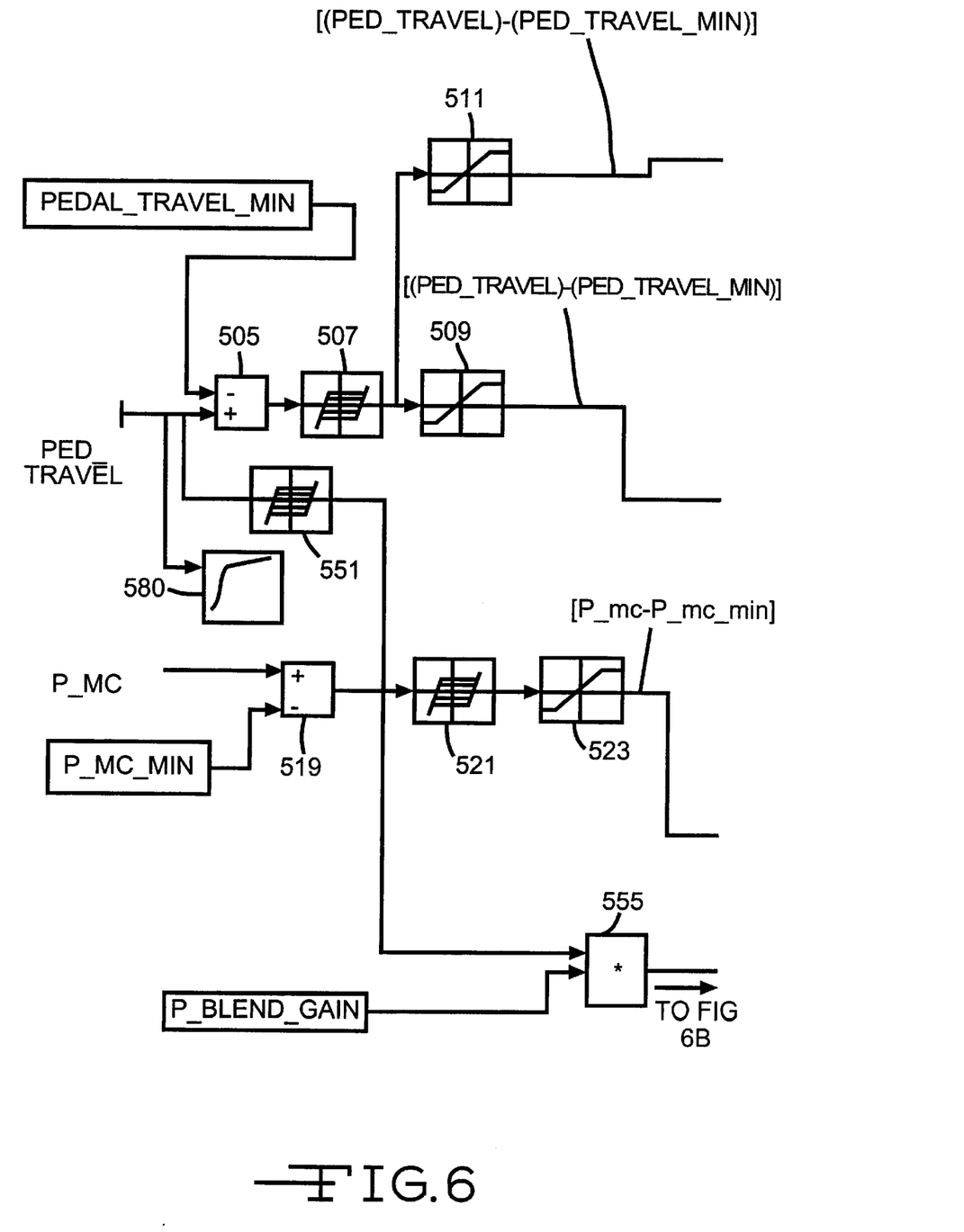
FIG. 6 is a block diagram of a pressure calculation unit that can be used in the system according to the invention.
Figure 6A:
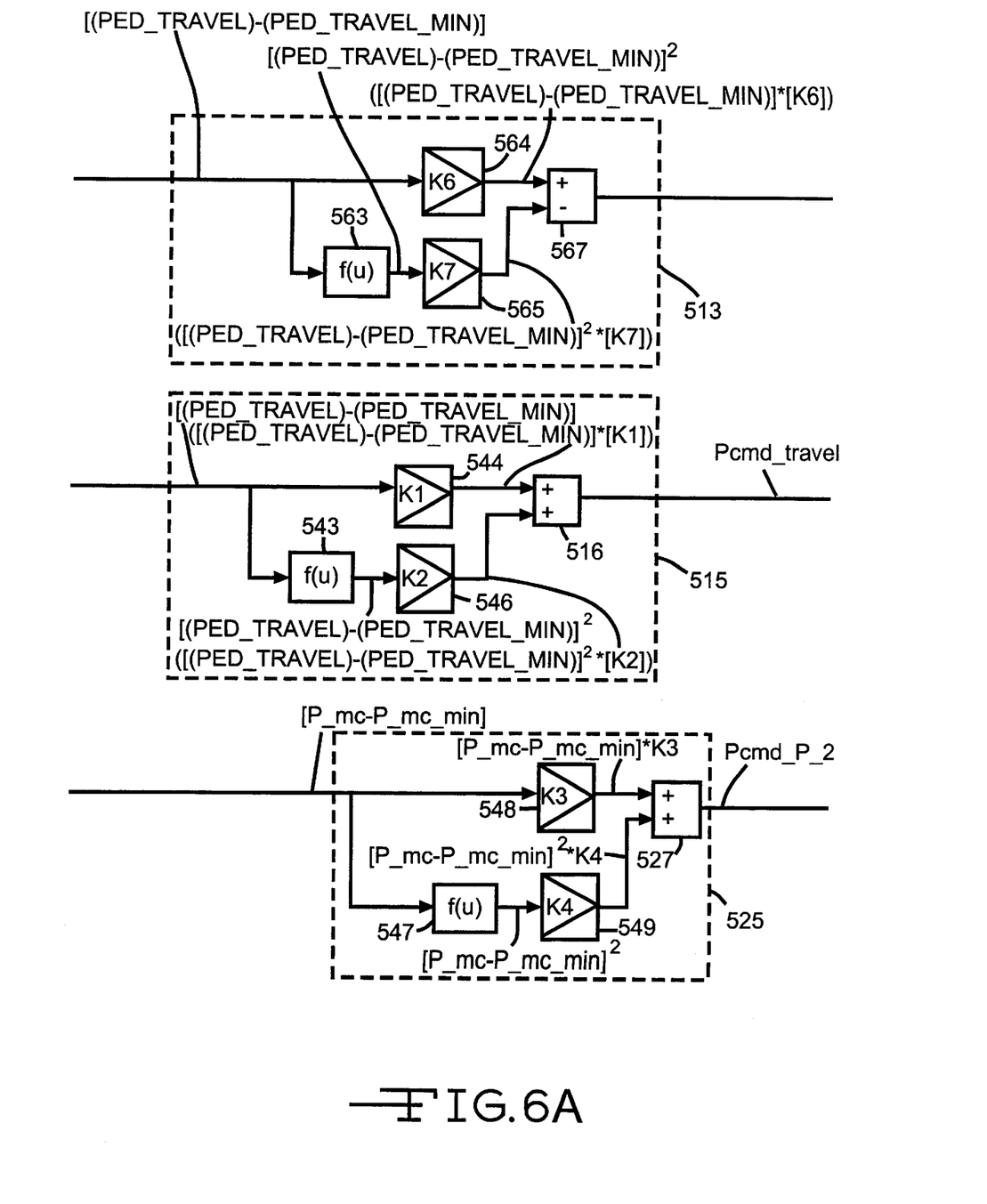
FIG. 6A is a continuation of FIG. 6 and thus forms a part of FIG. 6.
Figure 6B:
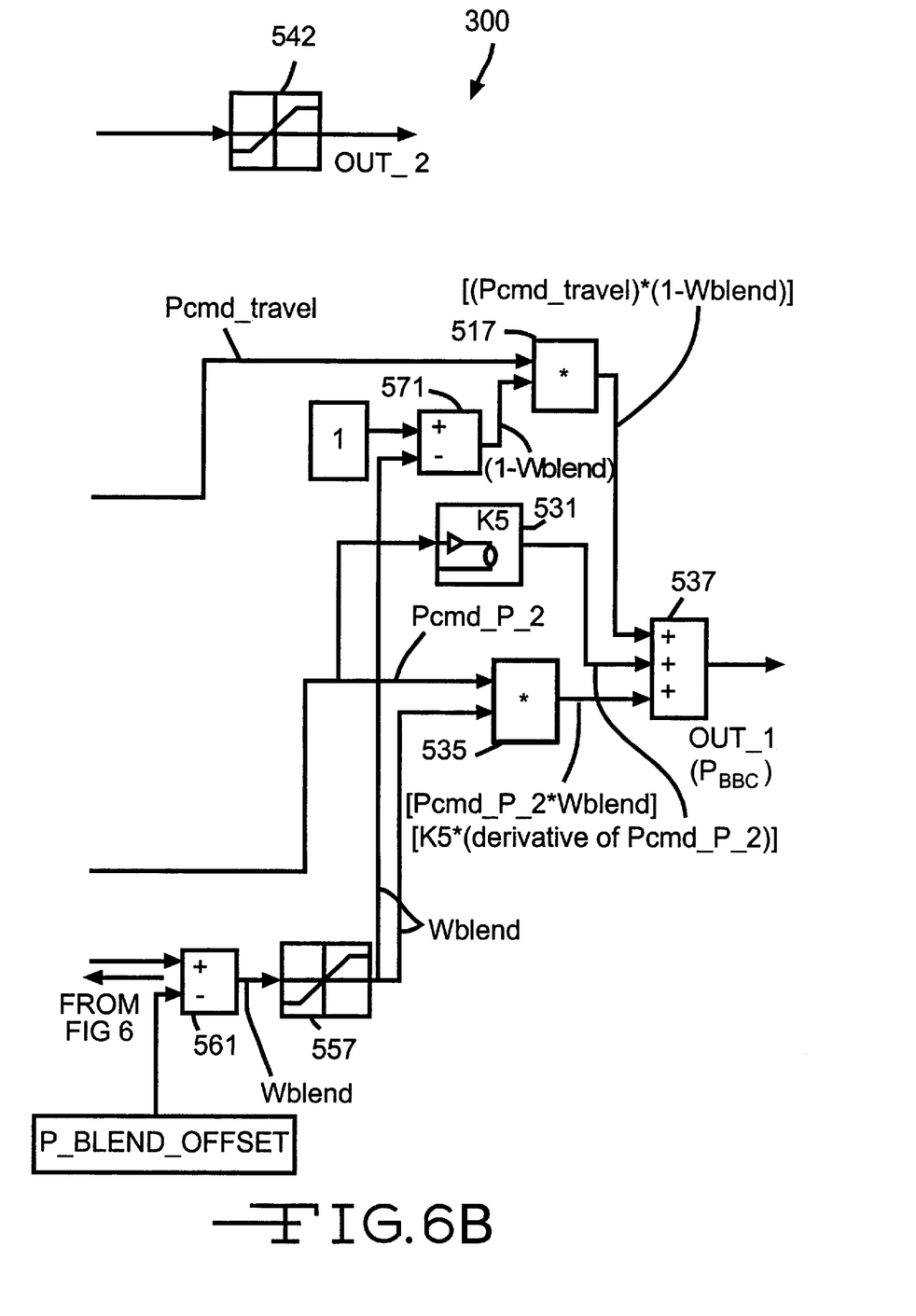
FIG. 6B is a continuation of FIG. 6 and 6A and thus forms a part of FIG. 6.

Control Unit 50 also determines a blending term according to the following equation:

$$W_{blend} = Ped\_Travel * K_{blend\_gain} - P_{blend\_offset}$$

where $K_{blend\_gain}$ is a constant used for a blending gain value, and where $P_{blend\_offset}$ is a constant used for a blending offset value. $W_{blend}$ is limited by a limiter (see FIG. 6) to obtain a blending value between 0 and 1.

Control Unit 50 also takes into consideration vehicle speed and the amount of pedal travel in determining an amount of jump-in of braking, so as to provide for a comfortable feeling to a vehicle braking operator while maintaining safe vehicular braking operation. This is done via a springer Calculation Unit, which will be described later and which is shown in detail in FIG. 7.

From the above-mentioned equations, Control Unit 50 determines a base brake command $P_{BBC}$ according to the following equation:

$$P_{BBC} = P_{cmd\_travel} * (1 - W_{blend}) +$$
$$P_{cmd\_mc\_p} * (W_{blend}) + K5 * \text{Derivative}(P_{cmd\_mc\_p}),$$

where K5 is a constant used in providing a dynamic part to the base brake command $P_{BBC}$ that is based on the derivative (or rate of change) of $P_{cmd\_travel}$.

In the present invention, Control Unit 50 effectively conditions Ped__Travel and P__mc in order to provide an output signal $P_{BBC}$ that is indicative of a desired amount of braking of an operator. In particular, Control Unit 50 provides limiting and backlash functions, so as to lessen noise terms and to ensure proper operation of the computation of the base brake command $P_{BBC}$. The limiting and backlash functions help to provide a true feel of braking and allow for proper control of braking by a brake control system. The Backlash function is operable in cases in which there is a certain amount of pedal travel (or master cylinder pressure) already applied, say 7 mm, and which provides a function such that any minor movement of the brake pedal, say, for example, a 0.5 mm change in brake pedal travel (or, for example, 0.25 bar change for master cylinder pressure) in that situation will not cause a change in the output signal $P_{BBC}$. Therefore, some measurable movement of the brake pedal (or measurable amount of change in master cylinder pressure) is required to cause a change in $P_{BBC}$ in cases where the brake pedal had already been moved a particular distance from an unactuated position (or where there is already a certain amount of master cylinder pressure pre-existing).

Conventional systems use a mechanical connection of brakes to hydraulics, in order to provide an amount of braking. In the system according to the invention, however, the operator's intent is measured through pedal travel "electrically" and master cylinder pressure "electrically", and which provide a desired brake command output.

Figure 3:
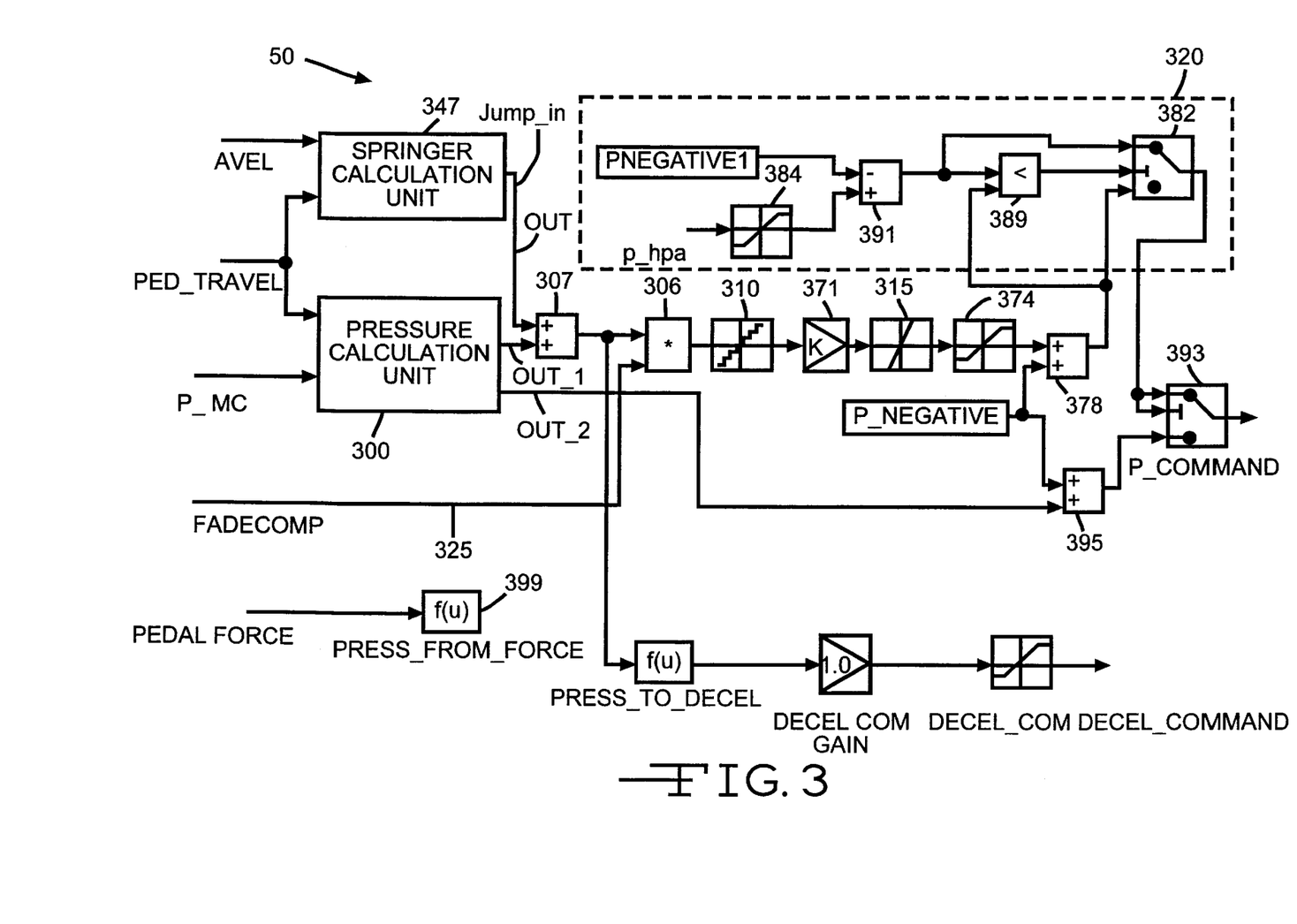
FIG. 3 is a block diagram of a control unit that can be used in the system according to the invention.

FIG. 3 shows a block diagram of the Control Unit 50, which includes a pressure calculation unit 300 that provides an output signal Out__1 based on a pedal travel signal Ped__Travel and master cylinder pressure signal P__mc. The output signal Out__is added with an output Out of the Springer Calculation Unit 347 via an Adder 307, and the output of the Adder 307 is multiplied by a fade compensation signal Fade__Comp received on line 325. The fade compensation signal Fade__Comp provides a weighting factor that is used in cases where the brakes have been actuated or almost always actuated for a certain amount of time, and which causes increased heating in the brake pads. This increased heating affects the friction coefficient of the brake pads and thus decreases the effectiveness of braking. For these situations where the brake pedal has been depressed longer than a predetermined period of time (e.g., going down a large hill under snowy conditions), in order to compensate for the decrease in actual braking caused by the heated brake pads, the brake fade compensation signal Fade__Comp provides a "boost" to the output of the Adder 307 (e.g., factor greater than 1.0) so as to achieve a desired amount of braking even in cases where the brake pads are not functioning at full operability due to a heated condition of the brakes.

A brake fade compensation used in generating Fade__Comp has a function for determining a time period in which the brakes have been constantly applied (or almost constantly applied). This time period can readily be determined from a brake travel sensor. The brake fade compensation unit also has a function for determining an amount of decrease in actual braking due to braking being applied for a certain period of time. This function may be accomplished by a look-up table, for example, which contains actual test data of braking effectiveness versus time in which brakes were constantly (or nearly constantly) applied, so as to determine the increase in a base brake signal that is needed in order to achieve an operator's desired amount of braking.

Figure 4:
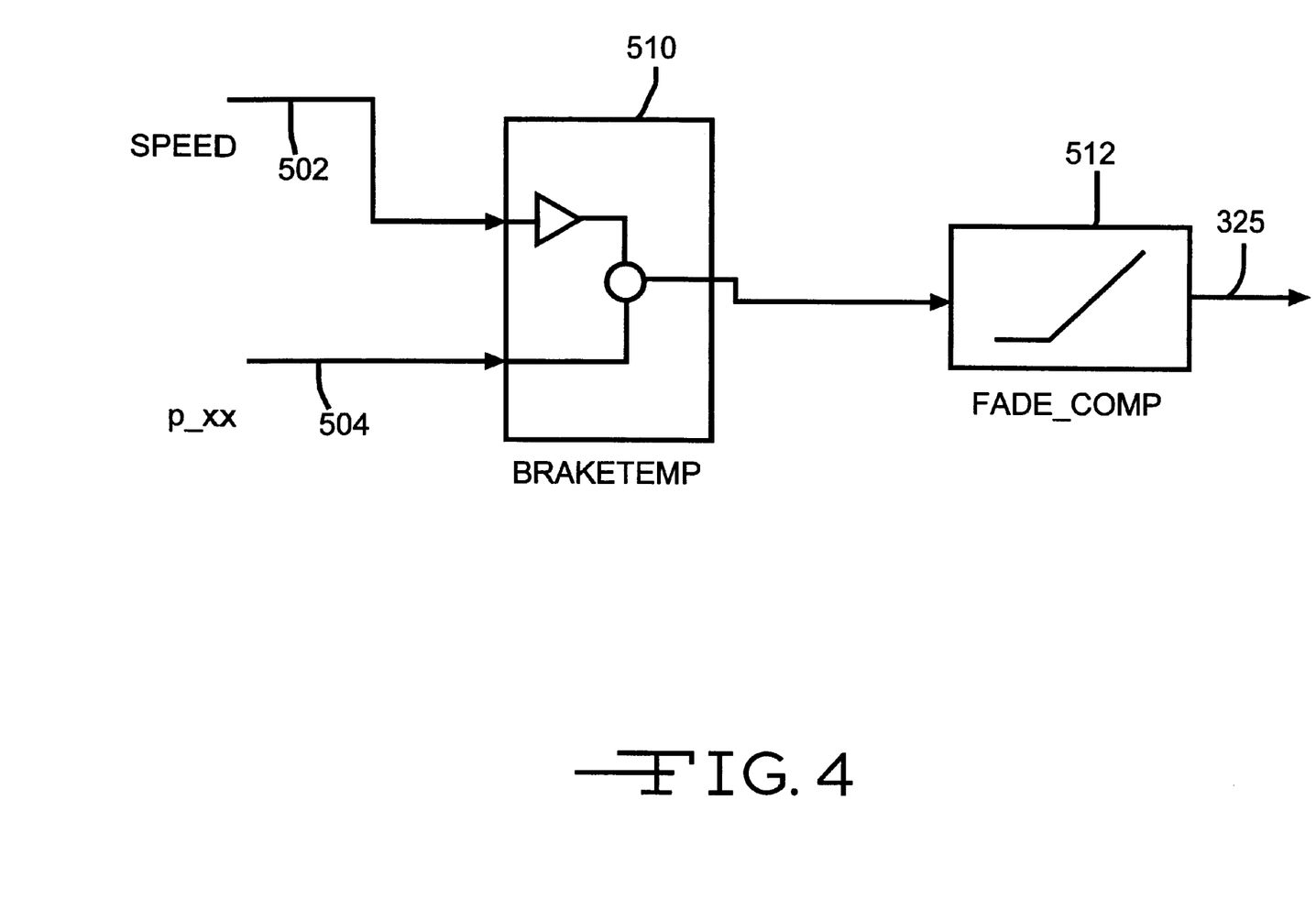
FIG. 4 is a block diagram of a fade compensation unit that can be used in the system according to the invention.
Figure 5:
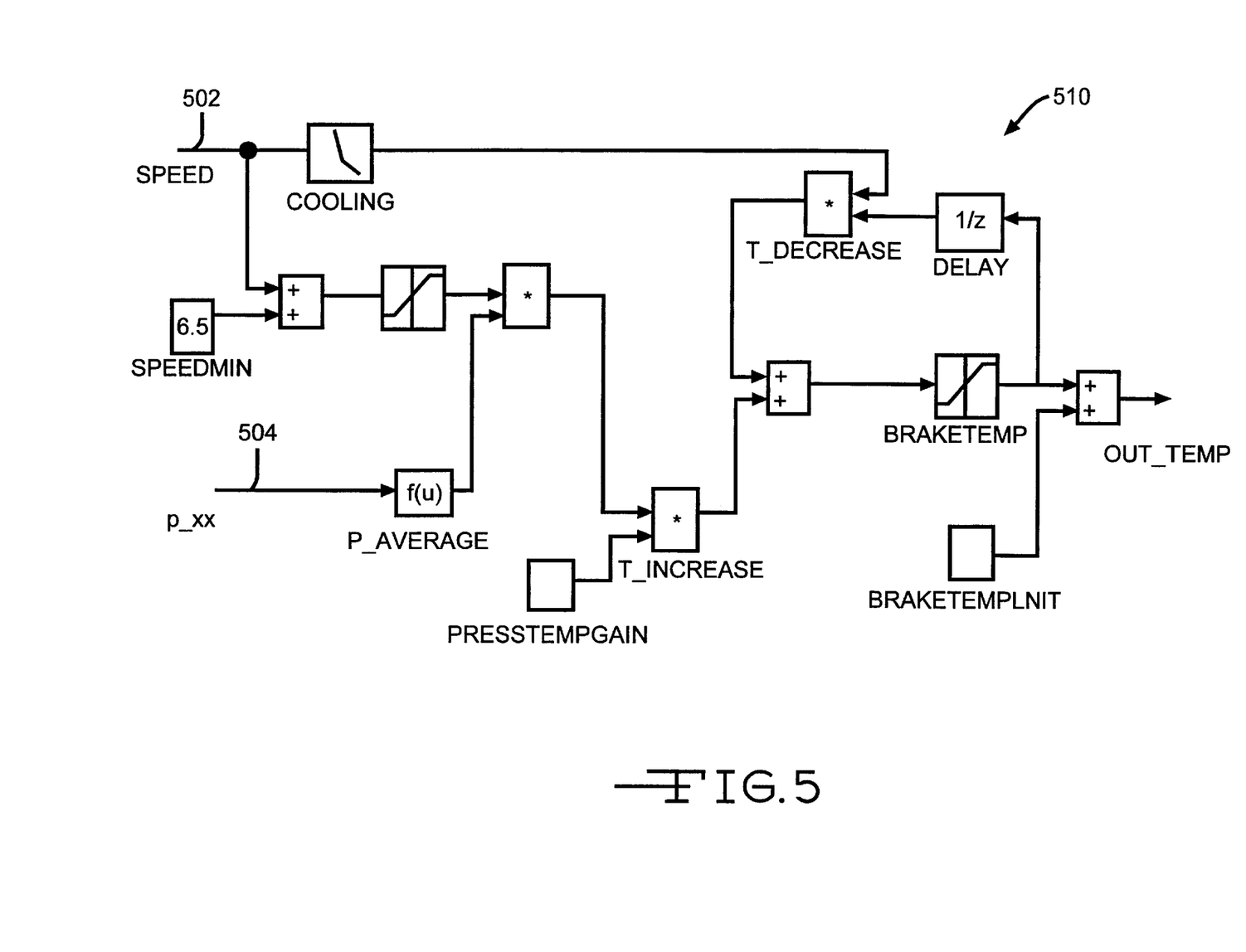
FIG. 5 is a block diagram of a brake temperature estimation unit that can be used in the system according to the invention.

A block diagram of a fade compensation unit 500 that can be utilized in the system according to the invention is shown in FIG. 4. Fade compensation unit 500 inputs a speed value Avel indicative of a vehicle speed, and a brake pressure value P__xx indicative of brake pressure (i.e., P__rr=right-rear brake pressure, P__fl=front-left brake pressure, etc.). From these inputs, brake temperature block 510 estimates a brake temperature, which may be done by a look-up table, for example. The estimated brake temperature is provided to a limiter 512 so as to limit the output value to an acceptable range, which outputs the Fade Compensation signal Fade__Comp. A block diagram of a brake temperature block 510 that can be used in the system according to the invention is shown in FIG. 5. Details of this figure are not provided in detail herein in order to more clearly describe the present invention. On a high level, the brake temperature block 510 provides a cooling model and a heating model to a brake application/non-application period in order to estimate a current brake temperature.

Referring back to FIG. 3, the output of Gain Circuit 306 is provided to a Resolution Circuit 310, which provides a minimum step size of changes at its input, so as to lessen hunting and/or noise. Resolution Circuit 310 effectively provides a quantization function, and is set to a step size value of 0.3 bar in the preferred embodiment. The output of the Resolution Circuit 310 is provided to a Gain Circuit 371 and then to a Slew Rate Limiting Circuit 315, which in the preferred embodiment is set to provide an output value within a range of no more than 500 bar/sec. The upper range of the Slew Rate Limiting Circuit 315 can be adjusted to suit particular operating conditions (i.e., 700 bar/sec). The elements within dashed box 320 of FIG. 3 are utilized to ensure that the pressure out of a valve smoothly transitions to zero bar before parking the valve. This is done by commanding a signal corresponding to P__hpa–P__negative1, where P__negative1 is a constant set to a value corresponding to 5 bar in the preferred embodiment, in cases when an operator's desired base brake signal (Out__1) is not less than 5 bar below the HPA pressure P__hpa.

In the preferred embodiment, the pressure command is extended to include a negative range of values via the use of P__negative and Out__2, where P__negative is set to value corresponding to a −3 bar base brake command in the preferred embodiment. Although "negative brake pressure" does not actually exist in a braking system, the use of a negative brake pressure commanded value is to remove any residual brake pressure from the brakes when a brake pedal release occurs, which can be done more expeditiously than if just a zero brake pressure commanded value is provided. Also, it is useful in cases where a valve has an offset error, such that a zero base brake command does not result in the valve being fully parked. By providing a negative pressure command, this will cause that valve to be parked in a position past the parked position, thereby overdriving the valves to ensure that even valves with offset errors will be properly parked.

The Slew Rate Limiter 315 receives an output from the Pressure Command Gain Unit 371, which in the preferred embodiment is set to a gain of 1, but which can be set to any particular value to provide a base brake signal having a particular range of allowable values used to drive valves to particular positions. The allowable range of values is based primarily on the type of valves being utilized. The Slew Rate Limiter 315 limits the rise and fall of a signal input to it to be within a predetermined range of rise/fall rates (i.e., no more than 500 bar/sec). The Slew Rate Limiter 315 provides a rate-limiting function so as not to cause operator discomfort during drastic changes in the base brake command signal, while maintaining safe braking operation.

The output of the Slew Rate Limiter 315 is limited by a Limiter 374 to an acceptable range of values for the type of valves being used in the system, and the output of the Limiter 374 is provided to a first input of an Adder 378. The second input of the Adder 378 is connected to receive a constant value P_negative, which is set to a value corresponding to −3 bar in the preferred embodiment. The output of Adder 378 is provided to a first input of a first 2:1 switch 382. A second input of the first 2:1 switch 382 receives a value that is set to 5 bar below P_hpa. A limiter 384 is set to a value such that when the HPA pressure P_hpa drops below 105 bar, the output of Limiter 384 remains at a value corresponding to 100 bar. This is done to provide a floor to provide for proper operation even when a malfunction in an HPA pressure sensor occurs (that provides the value P_hpa) or when a malfunction in the HPA itself occurs.

The value P_negative1 is subtracted from P_hpa by Arithmetic Unit 391, and is provided to a Comparator 389 and to a first input of the first 2:1 Switch 382. The second input to the first 2:1 Switch 382 is also input to the Comparator 389, which compares these two inputs to determine which of these is to be output by the first 2:1 Switch 382. In a case where the second input is greater than the first input, which is indicative of the operator desiring an amount of brake pressure that is very close to what is currently available in the HPA, the output of the first 2:1 Switch 382 is the second value. Otherwise, the output of the first 2:1 Switch 382 is the first value. The second value is used in cases where the operator's desired base brake command signal (based on pedal travel and master cylinder pressure) is more than 5 bar below the HPA pressure. In such cases, providing a base brake command based on the operator's desired base brake command signal would result in noise and ringing due to release of practically all of the fluid under pressure in the HPA, which is undesirable. Thus, an upper limit is provided to the base brake command signal to lessen any effects due to noise and/or ringing caused by releasing substantially all of the pressure in the HPA, with that upper limit being 5 bar below the current HPA pressure.

The output of the first 2:1 Switch 382 is provided to a first input of a second 2:1 Switch 393, and is also provided to a control input of the second 2:1 Switch 393. The second 2:1 Switch 393 provides an output based on a negative pressure value (P_Negative=a value corresponding to −3 bar command) when an operator-desired brake pressure is less than a predetermined threshold. An Adder 395 receives the P_Negative value (corresponding to −3 bar of brake pressure) at its first input, and receives a value Out_2 from the Pressure Calculation Section 300 at its second input, and provides a sum of these two values at its output. The output of the Adder 395 is provided to a second input of the second 2:1 Switch 393. Based on the value of the output of the first 2:1 Switch 382 being either greater or less than the predetermined value, either the first input or the second input of the second 2:1 Switch 393 is selected as the output base brake command $P_{BBC}$.

The output Out_2 of the Pressure Calculation Unit 300 is a value that is used in computing the base brake command value $P_{BBC}$ when the brake pedal travel is relatively small and during certain periods of brake pedal releasing. If there is residual pressure in the brake lines, the Pressure Calculation Unit 300 provides a negative pressure command, Out_2, which is used to release all of the pressure from the brake lines, via an open loop calculation. This will be explained in greater detail with reference to FIG. 6.

The output Out_1 of the Pressure Calculation Section 300 is a value that is used in computing the base brake command when a certain amount of pedal travel occurs, and will also be explained in greater detail with reference to FIG. 6. In particular, when the brake pedal is very lightly applied (i.e., 2 mm or less of pedal travel), the pedal travel value Ped_Travel and master cylinder pressure value P_mc will be small, and the output Out_1 from the Pressure Calculation Section 300 will also be a small value. The output Out_1, after being processed by the functions as shown in FIG. 6, will still be a relatively small value, which will be less than the predetermined threshold of the second 2:1 switch 393. In those instances, a negative pressure command that is based on the output Out_2 of the Pressure Calculation Section 300 and on P_Negative, is used to provide a negative base brake command signal $P_{BBC}$, which is used to park the valves completely (even those valves that may have an offset error). In other words, when a valve is to be set to a closed position so as to achieve zero pressure, a valve offset error may result in the valve remaining partially open when a zero pressure $P_{BBC}$ command is generated. By instead generating a negative pressure $P_{BBC}$ command that is greater than the potential valve offset, the valve will be overdriven to make it fully closed despite any valve offset. Allowing for a negative pressure command also allows one to compensate for valve dynamics by overdriving valve command signals, for example, when one wants to reduce brake pressure to zero during ABS commands where fast pressure relief is necessary. By driving the base brake command signal $P_{BBC}$ to command a negative brake pressure, this ensures that the valves completely shut to ensure maximum pressure reduction rates.

Turning now to FIG. 6, there is shown a block diagram of the pressure calculation section 300. Pressure Calculation Section 300 receives a pedal travel signal Ped_Travel and a master cylinder pressure signal P_mc. Based on these two inputs, pressure values Out_1 and Out_2 are generated, which are used in computing the base brake command $P_{BBC}$, as shown in FIG. 3, and as discussed above.

The Ped_Travel signal is provided to an Arithmetic Element 505, which subtracts a constant value Pedal_travel_min from Ped_Travel to provide an output value of the Arithmetic Element 505. In the preferred embodiment, Pedal_travel_min is set to 7 mm, and is used to ensure that a base brake signal based on Out_1 is not generated until the pedal has moved at least a certain amount (e.g., more than 7 mm from its unactuated position). The output of Arithmetic Element 505 is provided to a Backlash Unit 507. Backlash Unit 507 has a hysteresis that has a backlash value preferably set to 1 mm, so that any movements of less than 1 mm of the brake pedal, after the brake pedal has already moved past a predetermined travel amount, will not cause a change in the output of Backlash Unit 507. The output of Backlash Unit 507 is provided both to a limiter 509 and to a limiter 511, which both limit the output of Backlash Unit 507 to an acceptable range of values.

The output of limiter 511 is provided to a first linear and quadratic calculation unit 513, and the output of Limiter 509 is provided to a second linear and quadratic calculation unit 515. The output of the first linear and quadratic calculation unit 513 provides an output of the form $K_6A+K_7A^2$, where A is the output value of Limiter 511, which has been limited to a value of zero or less. The output of the second linear and quadratic calculation unit 515 provides an output of the form $K_1B+K_2B^2$, where B is the output value of Limiter 509, which has been limited to a value of zero or more.

The output of the first linear and quadratic calculation unit 513 is limited by a limiter 542 to a value of zero or less, and output as Out_2. More particularly, the first linear and quadratic calculation unit 513 includes a squarer unit 563, a gain unit 564 having a gain value of K6, a gain unit 565 having a gain value of K7, and an Arithmetic Element 567. The negative-valued output of limiter 511 is squared by squarer unit 563, to produce a positive value. This positive value is multiplied by a constant K7 via gain unit 565. The output of gain unit 565 is provided to a "−" input of arithmetic element 567, where it is subtracted from a value corresponding to K6 times the output of limiter 511. This results in a negative value being output by arithmetic element 567, which is limited by limiter 542 to a value of zero or less, thereby providing a negative pressure command value Out_2 that is based on the pedal travel signal Ped_Travel. The value Out_2 is used to generate $P_{BBC}$ when a base brake command that is based on Out_1 is less than a fixed value, as determined by the second 2:1 Switch 393 of FIG. 6. This occurs when Ped_Travel is small (e.g., <7 mm), resulting in a negative value output from Arithmetic Element 505, and thereby resulting in a negative value for Out_2.

The output of the second linear and quadratic calculation unit 515, with that output corresponding to $P_{cmd\_travel}$, is provided to a weight unit 517, which provides a weight to the output of the second linear and quadratic calculation unit 515 based on an amount of pedal travel Ped_Travel. The second linear and quadratic calculation unit 515 includes a squarer unit 543, a gain unit 544 having a gain value of K1, a gain unit 546 having a gain value of K2, and an Adder 516.

The master cylinder pressure value P_mc is provided to an Arithmetic Element 519, where a constant value P_mc_min is subtracted from it. The value P_mc_min is preferably set to a value corresponding to 0.3 bar, and provides a value such that a certain amount of pressure must exist (e.g., >0.3 bar) in the master cylinder before that value is used in computing Out_1. The output of Arithmetic Element 519 is provided to a Backlash Unit 521, which is preferably set to have a hysteresis with a backlash value of 0.25. Thus, any changes in master cylinder pressure of 0.25 bar or less, after the master cylinder pressure is greater than a predetermined pressure value, will not cause a change in the output of Backlash Unit 521. The output of Backlash Unit 521 is provided to a limiter 523, where it is limited to a value within an acceptable range.

The output of limiter 523 is provided to a third linear and quadratic calculation unit 525, which provides an output in the form $K_3C+K_4C^2$, where C is a value corresponding to the output of limiter 523, which has been limited to a value of zero or more. The third linear and quadratic calculation unit 525 includes a squarer unit 547, a gain unit 548 having a gain value of K3, a gain unit 549 having a gain value of K4, and an Adder 527. The output of Adder 527, which is a value corresponding to pressure required that is calculated from master cylinder pressure P_mc (that is, $P_{cmd\_mc\_p}$), corresponds to the output of the third linear and quadratic calculation unit 525.

The output of Adder 527 is provided to a Dynamic Part 531, which takes a derivative of the output of adder 527, and multiplies that derivative by a fixed gain value (K5). Adder 537 adds: i) the output of Dynamic Part 531, which corresponds to a rate of change of the required pressure command that is based on the master cylinder pressure P_mc, ii) a weighted output of the gain element 517 (which corresponds to the weighted pressure that is calculated based on pedal travel Ped_Travel), and iii) a weighted output of the gain element 535 (which corresponds to the weighted pressure that is calculated based on the master cylinder pressure P_mc).

Thus, the output Out_1 is based on a first value that corresponds to a function of pedal travel, a second value that corresponds to a function of master cylinder pressure, and a third value that is a function of the rate of change of the pressure required that is calculated from master cylinder pressure.

The determination as to how much of each of these three values is to be used to provide the output signal Out_1 is provided by the elements located at the bottom portion of FIG. 6. In particular, the pedal travel value Ped_Travel is provided to a Backlash Unit 551, which has a hysteresis with a backlash value of 7 in the preferred embodiment. The backlashed output of Backlash Unit 551 is multiplied by a constant value T_Blend_Gain via a Multiplier 555. In the preferred embodiment, T_Blend_Gain is set to 142. Another constant value, T_Blend_Offset, which is set to 1 in the preferred embodiment, is subtracted from the output of Multiplier 555 via Arithmetic Element 561, and that value is limited to with a range of 0 to 1 by Limiter 557.

The output of Limiter 557 is provided to a "−" input of Arithmetic Element 571, where it is subtracted from a Constant Value "1" to provide a value that corresponds to an amount of weighting to be provided to the output of the second linear and quadratic calculation unit 515. The output of Limiter 557 is also provided to gain element 535, where it provides an amount of weighting to the output of the third linear and quadratic calculation unit 525. In cases where the output of Limiter 557 is equal to 1, the value Out_1 is not based at all on the pedal travel amount Ped_Travel. If the output of Limiter 557 is equal to 0, the value Out_1 is only based on the pedal travel amount and the rate of change of master cylinder pressure, and is not based at all on the master cylinder pressure amount. If the output of Limiter 557 is equal to 0.5, then the pedal travel amount and the master cylinder pressure amount provide equal amounts of contribution to the output Out_1, along with an amount provided by the Dynamic Part 531.

The values T_Blend_Gain, T_Blend_Offset, and the backlash values of the Backlash Unit 551 are each set to a value such that, on an initial brake apply (that is, when the brake pedal has only moved a certain distance from its unactuated position), a base brake command is based primarily on the pedal travel amount Ped_Travel, and not much at all on the master cylinder pressure P_mc. This is because that for low amounts of brake application, the master cylinder pressure is very small, and providing a base brake command based primarily on this value may introduce inaccuracies in the computation of the base brake command $P_{BBC}$.

When the amount of braking applied increases, the system according to the invention allows for more contribution from the P_mc value and less contribution from the Ped_Travel value. Thus, as the brakes are further applied after the initial apply (that is, when the brake pedal is moved further away from its unactuated position), the contribution due to master cylinder pressure P_mc increases while the contribution due to brake pedal Ped_Travel decreases. Also, during reduction of braking (that is, when the brake pedal moves back towards its unactuated position), the base brake command $P_{BBC}$ is calculated using the master cylinder pressure value P_mc for a longer period of time than it does with respect to the use of pedal travel Ped_Travel during the initiation and increase of braking. This is due to the Backlash Unit 551 having a hysteresis with a backlash set to a value such as 7 in the preferred embodiment, so that, after the brake pedal have been disengaged, it takes more than a 7 mm movement of the brake pedal before the weighting value that is the output of limiter 557 changes.

The amount of blending of the contribution of pedal travel Ped_Travel and master cylinder pressure P_mc is due to the specific values chosen for the constants T_Blend_Gain and T_Blend_Offset, which can be set to any other desired values than the ones given above as suitable for a particular vehicle.

Figure 7:
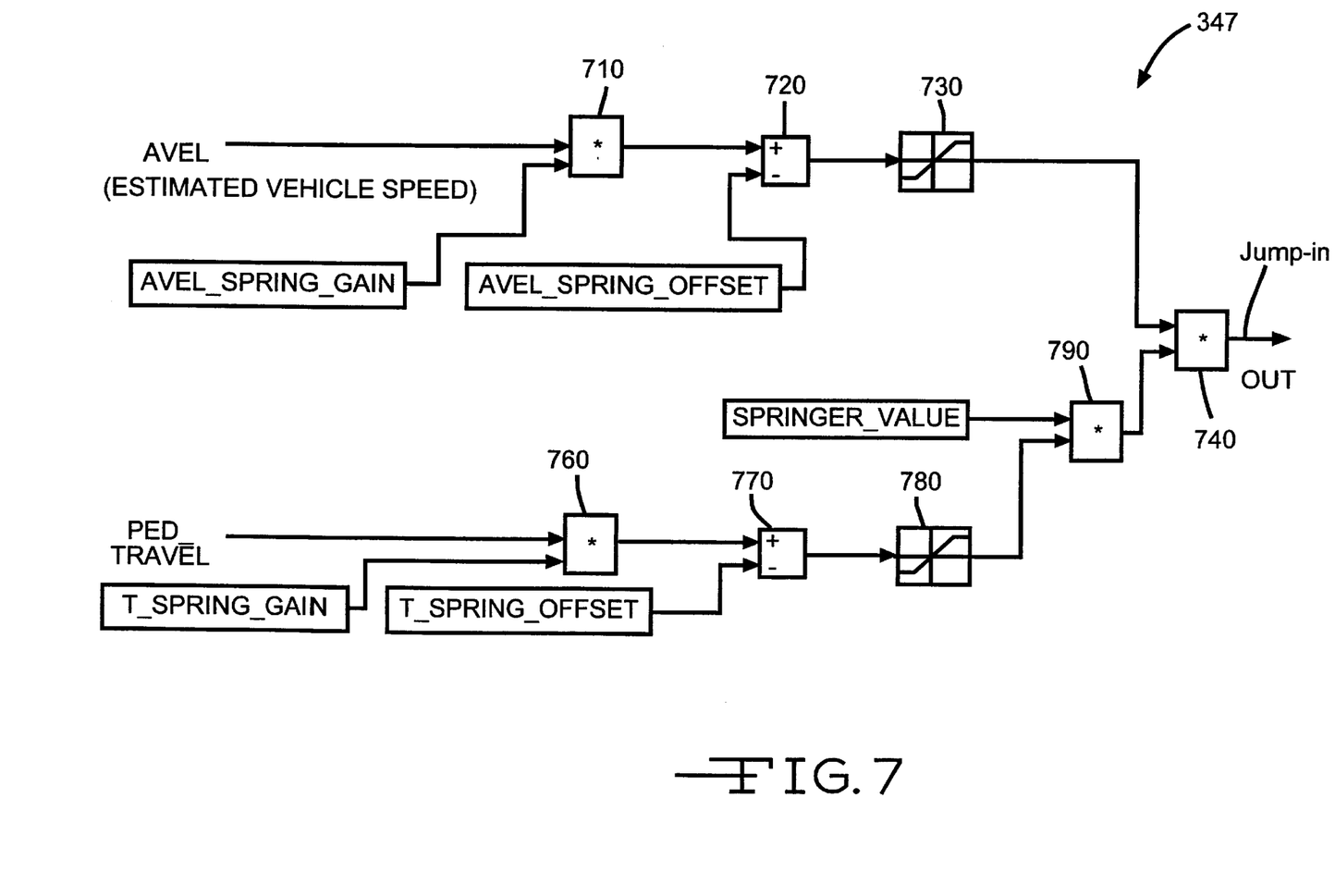
FIG. 7 is a block diagram of a springer calculation unit that can be used in the system according to the invention.

FIG. 7 shows the details of the Springer Calculation Unit 347. The Springer Calculation Unit 347 provides a jump-in value for vehicle braking that is based on estimated vehicle speed Avel and on pedal travel Ped_Travel. Estimated vehicle speed Avel may be computed by any number of ways, as in known to one of ordinary skill in the art, such as by taking an average of the four wheel speeds, and converting that value to a longitudinal speed. The purpose of the Springer Calculation Unit 347 is to provide a smaller jump-in of braking when the vehicle is going at a slow rate of speed, such as driving in a parking lot, and to provide a larger jump-in of braking when the vehicle is going at a faster rate of speed, such as driving on a highway. Thereby, better operator comfort is achieved by the use of the Springer Calculation Unit 347. For example, when the vehicle is going at, say, 5 kph in a parking lot, when the operator lightly applies the brakes, there should not be a sudden jerk in the vehicle due to application of the braking, and the brake jump-in is set to a very small value to allow for an easing into braking. However, when the operator lightly applies the brakes when the vehicle is operating at a faster rate of speed, say 30 kph in a highway, then the jump-in is made larger so as to provide an acceptable amount of braking to suit the vehicle operating environment.

In FIG. 7, a first constant Avel_Spring_Gain, set to 0.01428 in the preferred embodiment, is multiplied, via Multiplier 710, by the estimated vehicle speed Avel. A second constant Avel_Spring_Offset, which is set to a value 0.1428 in the preferred embodiment, is subtracted from the output of Multiplier 710, with the subtraction performed by Arithmetic Element 720. The output of Arithmetic Element 720 is limited by Limiter 730 to a value between 0 and 1. The output of Limiter 730 is provided to a first input of a multiplier 740.

The pedal travel signal Ped_Travel is multiplied, via Multiplier 760, by a third constant $T_{13}$ Spring_Gain, which is set to 125 in the preferred embodiment. A fourth constant T_Spring_Offset, which is set to a value 1.25 in the preferred embodiment, is subtracted from the output of Multiplier 760, with the subtraction performed by Arithmetic Element 770. The output of Arithmetic Element 770 is limited by Limiter 780 to a value between 0 and 1. The output of Limiter 780 is provided to a multiplier 790. The multiplier 790 multiplies the output of limiter 780 by a constant springer jump-in value Springer Value, which is set to a value corresponding to 6 bar in the preferred embodiment. The output of Multiplier 790 is provided to a second input of Multiplier 740, and the output of Multiplier 740 corresponds to the output Out of the Springer Calculation Unit 347.

In the preferred embodiment, the four offset and gain constants provided for the Springer Calculation Unit 347 are set such that the amount of brake jump-in due to vehicle velocity Avel starts at 10 kph, and the jump-in due to vehicle velocity is maximum at 80 kph and higher velocities. Similarly, the amount of brake jump-in due pedal travel starts at 10 mm of pedal travel, and the jump-in is maximum at 18 mm of pedal travel and higher amounts of pedal travel. Of course, the constants used in the Springer Calculation Unit 347 can be set to other values to provide different ranges of jump-in due to vehicle velocity and pedal travel, based on particular vehicular requirements. The output Out of Springer Calculation Unit 347 is added with the output Out_1 of Pressure Calculation Unit 300, as shown in FIG. 3, so as to provide to appropriate amount of brake jump-in to the output $Out_{-1}$ of Pressure Calculation Unit 300.

While an embodiment has been described herein, modification of the described embodiment may become apparent to those of ordinary skill in the art, following the teachings of the invention, without departing from the scope of the invention as set forth in the appended claims. For example, in a "pure" BBW system that has no hydraulic components, not even a back-up hydraulic braking system, master cylinder pressure is not available for use in computing the base brake command signal. In those systems, pedal force may be utilized instead of master cylinder pressure, since master cylinder pressure provides a measure of pedal force in any event. Pedal force may be measured, for example, by a force sensor provided on the brake pedal, or it may be computed based on pedal travel inputs obtained from the pedal travel sensor.

FIG. 3 shows a pedal force value Pedal_Force that is provided for systems that do not have a master cylinder. Also, pedal force can be used in systems having master cylinders, in order to verify that the sensed master cylinder pressure P_mc is within acceptable limits based on the sensed pedal force Pedal_Force. Test data may be used by a Pedal Force Unit 399 to make such a verification.

FIG. 6 shows a Lookup Unit 580 that is used as a failsafe device. Lookup Unit 580 includes a memory (not shown) for storing typical value of master cylinder pressure-versus-pedal travel amount, based for example, on test or experimental data. In cases where the P_mc value and the Ped_Travel value are not with a prescribed relationship to each other as determined by the locus of data points stored in the memory, then it is determined that one of the sensors has malfunctioned. The Lookup Unit 580 in this situation can be used to correct for errors in one of the sensors. For example, when Ped_Travel is sensed to be a large value (20 mm), but P_mc is sensed to be a small value (0.1 bar), then one of the two sensors is incorrect, and the Lookup Unit 580 will modify the sensed values so as to provide an amount of braking based on the sensed value that indicates a greater amount of desired braking (i.e., modify P_mc based on pedal travel of 20 mm in the example given).

Still further, FIG. 3 shows a path at the bottom of the figure that is used to provide a deceleration command that is based on the output of Adder 307. The pedal travel amount is used to command vehicle deceleration independently of weight (load and/or number of passengers) of the vehicle. Deceleration of the vehicle varies based on load and brake condition/quality. As shown in FIG. 3, the brake command from the driver is used to determine how the vehicle should decelerate, rather than to use how much pressure there is in the brake lines. The deceleration command is used in a separate calculation block (not shown), which provides an updated gain value for the brake pedal so as to compensate for vehicle load variations and in changes in the brake condition/quality over time. Thus, there is provided to the driver the same braking "feel", irrespective as to brake quality and load carried by the vehicle.

In FIG. 3, a computation unit 351 computes a pressure-to-deceleration value, a gain unit 353 provides a deceleration command gain (preferably set to "1"), and a limiter 355 provides a limited output that corresponds to the deceleration command Decel_Command.

What is claimed is:

1. An apparatus for determining a total amount of brake jump-in for a vehicle during brake application, comprising:
    a first input port for receiving a first signal that is indicative of vehicle speed;
    a second input port for receiving a second signal that is indicative of brake pedal travel; and
    a control unit for determining a first component of a brake command signal based upon the second signal and for determining a total amount of brake jump-in based on the first and second signals, the jump-in forming a second component of the brake command signal resulting in a step increase of the brake command signal after an initial amount of pedal travel.

2. An apparatus according to claim 1, wherein the control unit comprises:
    a memory for storing a first gain value and a first offset value that are used in determining a first amount of jump-in that is to be provided based on the first signal, and for storing a second gain value and a second offset value that are used in determining a second amount of jump-in that is to be provided based on the second signal; and
    a multiplier for multiplying the first and second amounts of jump-in to obtain the total amount of jump-in for the vehicle.

3. An apparatus for providing a brake control signal $P_{BBC}$, comprising:
    a first sensor for sensing an amount of travel of a brake pedal, said first sensor generating an output Ped_Travel;
    a second sensor for sensing one of an amount of master cylinder pressure or force exerted upon the brake pedal, said second sensor generating an output P_2; and
    a control circuit for providing the brake control signal based on the outputs of the first and second sensors, the control circuit determining a first command signal based on the output of the first sensor according to the equation $$P_{cmd\_travel} = [(Ped\_Travel - Ped\_Travel\_Min) * K_1 + (Ped\_Travel - Ped\_Travel\_Min)^2 * K_2],$$

the control circuit determining a second command signal based on the output of the second sensor according to the equation $$P_{cmd\_P\_2} = [(P\_2 - P\_2\_min) * K_3 + (P\_2 - P\_2\_min)^2 * K_4],$$

where P_2_min is a constant value indicative of a minimum value of P_2, the control circuit determining a blending term according to the equation $$W_{blend} = Ped\_Travel * K_{blend\_gain} - P_{blend\_offset},$$

the control circuit determining the brake control signal $P_{BBC}$ according to the equation $$P_{BBC} = P_{cmd\_travel} * (1 - W_{blend}) + P_{cmd\_P\_2} * (W_{blend}) + K5 * \text{Derivative}(P_{cmd\_P\_2}).$$

4. A method of providing a brake pressure control signal, comprising the steps of:
    sensing an amount of travel of a brake pedal;
    sensing an amount of master cylinder pressure;
    determining a first component of a brake pressure control signal based on the sensed amount of travel;
    determining a second component of the brake pressure control signal based on the sensed amount of master cylinder pressure; and
    determining, as a third component of the brake pressure control signal a rate of change of the second component of the brake pressure control signal over a period of time,
    wherein the brake pressure control signal is based on the first component, the second component, and the third component.

5. A method according to claim 4, wherein the brake pressure control signal is based on a weighting for the first and second components, and a total amount of the third component.

6. A method of providing a brake control signal, comprising the steps of:
    sensing an amount of travel of a brake pedal;
    sensing an amount of master cylinder pressure;
    determining, based on the sensed amount of travel, a first weighting value that is used to determine a contribution of pressure required from the sensed amount of travel; and
    determining, based on the sensed amount of travel and not on the sensed master cylinder pressure, a second weighting value that is used to determine a contribution of pressure required from the sensed master cylinder pressure, wherein the first weighting value added to the second weighting value is equal to one.

7. An apparatus for determining a total amount of brake jump-in for a vehicle during brake application, comprising:
    a first input port for receiving a first signal that is indicative of vehicle speed;
    a second input port for receiving a second signal that is indicative of brake pedal travel; and
    a control unit for determining the total amount of brake jump-in based on the first and second signals, the control unit comprising:
        a memory for storing a first gain value and a first offset value that are used in determining a first amount of jump-in that is to be provided based on the first signal, and for storing a second gain value and a second offset value that are used in determining a second amount of jump-in that is to be provided based on the second signal; and a multiplier for multiplying the first and second amounts of jump-in to obtain the total amount of jump-in for the vehicle.

8. A method of providing a brake pressure control signal, comprising the steps of:

sensing an amount of travel of a brake pedal;

sensing an amount of force applied to the brake pedal;

determining a first component of a brake pressure control signal based on the sensed amount of travel;

determining a second component of the brake pressure control signal based on the sensed amount of force applied to the brake pedal; and determining, as a third component of the brake pressure control signal a rate of change of the second component of the brake pressure control signal over a period of time, wherein the brake pressure control signal is based on the first component, the second component, and the third component.

9. An apparatus for providing a brake control signal for a vehicle, comprising:

a first sensor for sensing an amount of travel of a brake pedal;

a second sensor for sensing vehicle speed a third sensor for sensing an amount of force applied to the brake pedal; and a control unit for providing the brake control signal based on the outputs of the first and third sensors, as modified by the outputs of the first and second sensors to provide jump-in, the jump-in forming a component of the brake control signal resulting in a step increase of the brake control signal after an initial amount of pedal travel.

* * * * *